Sept. 28, 1965 V. J. LUNDELL 3,208,206
PROCESS AND APPARATUS FOR HOMOGENIZING HAY AND SELECTIVELY
WINDROWING THE SAME
Filed Jan. 12, 1962
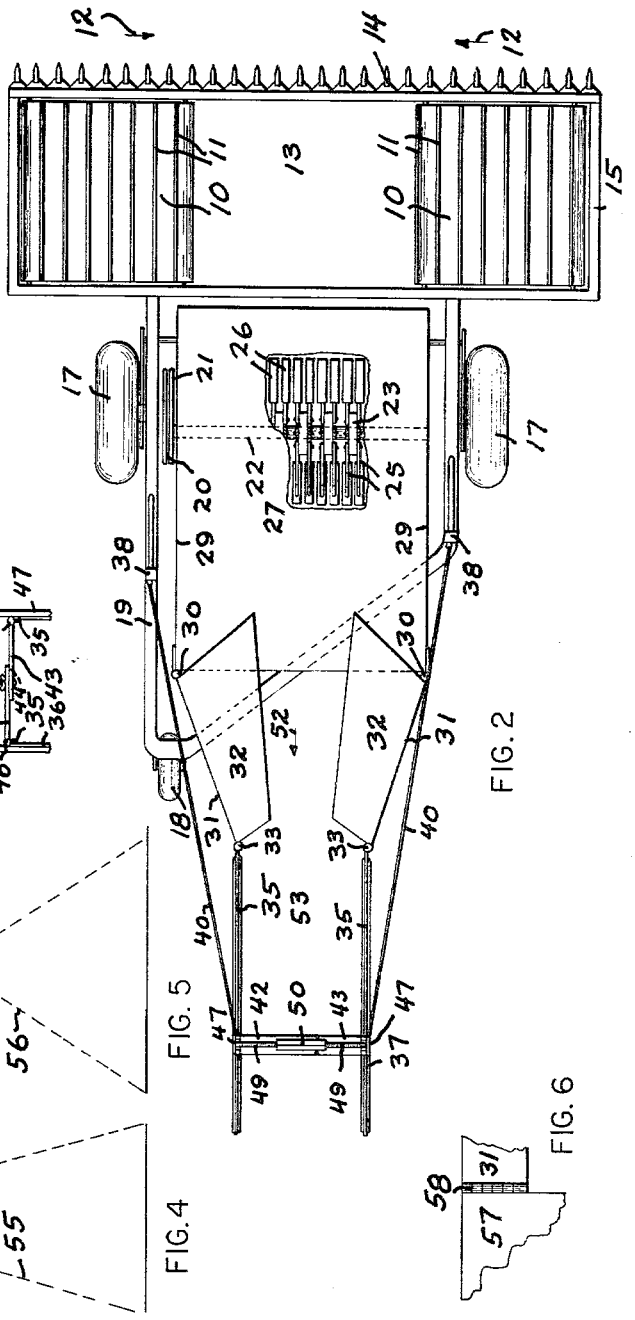
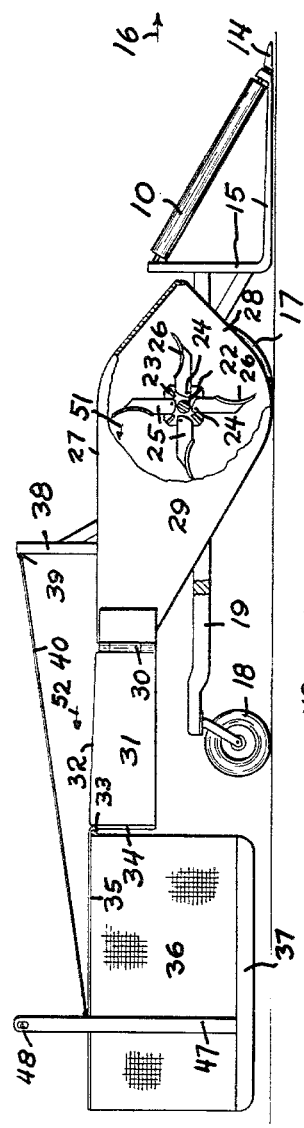
INVENTOR.
Vernon J. Lundell
BY
Sam J. Slotsky
ATTORNEY

United States Patent Office 3,208,206
Patented Sept. 28, 1965

3,208,206
PROCESS AND APPARATUS FOR HOMOGENIZING HAY AND SELECTIVELY WINDROWING THE SAME
Vernon J. Lundell, Cherokee, Iowa
Filed Jan. 12, 1962, Ser. No. 165,899
1 Claim. (Cl. 56—23)

My invention relates to a process and apparatus for homogenizing hay and windrowing the same.

An object of my invention is to provide a process and apparatus wherein hay can be cut and gathered in the field by means of a swather type of apparatus, and whereby such hay is then thoroughly homogenized by mixing the leaves and stems of the like, and then placing the resultant material into a certain shape to provide the best drying effect, and wherein such shape will provide the greatest effective drying area.

A further object of my invention is to provide a useful attachment which can be directly connected to a swather or window.

A further object of my invention is to provide an adjustable arrangement whereby the windrow can be made of any desired thickness or heighth.

With these and other objects in view, my invention consists in the construction, arrangement, and combination of the various parts of my device, whereby the objects contemplated are attained, as hereinafter more fully set forth, pointed out in my claims, and illustrated in the accompanying drawings, in which:

FIGURE 1 is a side view of the device as attached to a windrower,

FIGURE 2 is a plan view of FIGURE 1,

FIGURE 3 is a schematic cross sectional view of one form of the windrow formed by my invention, FIGURE 4 is a further schematic cross sectional view of a further windrow formed by my invention, FIGURE 5 is a still further schematic cross sectional view of a further windrow formed by my invention, FIGURE 6 is a modification of the material concentrating side members, and, FIGURE 7 is an end view of FIGURE 1.

My invention contemplates the provision of an apparatus which will thoroughly mix cut hay, and which will aso provide a special type of windrow to assist in the drying action of the windrow.

I have used the character 10 to designate a pair of traveling belt arrangements to which are attached the slats 11, the belts 10 traveling in the direction of the arrows 12 toward the central open portion 13, the character 14 indicating a sickle arrangement, and the character 15 indicating framework portions, these various members being conventional parts of a tractor mounted windrower.

The unit is adapted to travel in the direction of the arrow 16 and the reel is not shown herein.

The character 17 indicates side wheels upon which the frameworks are mounted and which support the unit, the character 18 indicates an off set wheel, the character 19 indicating further framework portions.

The wheels 17 can be driven in any desired manner so that the entire unit will travel forwardly, the belts 10 also being suitably driven and the character 20 indicates a pulley driven by means of a belt 21 from any suitable source to thereby drive the shaft 22 to which are attached the members 23, and pivotally attached at 24 to the members 23 are the chopping bars 25 including the arcuate portions 26, this arrangement being enclosed within the casing 27 having the open portion at 28. The casing 27 includes the side walls 29, and hinged at 30 to the casing 27 are the side members 31 which extend into the integral portions 32, and hinged at 33 to the members 31 are the rods 34 which extend into the horizontal portions 35 which are attached to the vertically positioned canvas or other material members 36 which are attached to the bars 37.

The character 38 designates posts or supports attached to the casing 27, to which are attached at 39 the cables 40 which are attached at 41 to the members 35 to thereby support the same.

Attached to the members 35 are the straps 42 and 43, the strap 43 including the slot 44 in which is received the bolt 45, this arrangement providing an adjustable feature whereby the members 36 can be laterally spaced as desired.

Pivotally attached at 46 to the straps 42 and 43 (see FIGURE 5) are the vertically positioned straps or bars 47, the lower portions of the bars 47 being secured to the members 37, and pivotally attached at 48 to the upper ends of the bars 47 are the threaded rods 49 which are engaged by a turn-buckle member 50, this arrangement thereby providing means whereby the upper ends of the bars 47 can be adjustably spaced, and thereby changing the shape of the resultant windrow as will be described.

The device operates in the following manner.

As a unit travels forwardly in the direction of the arrow 16, the crop will be cut substantially at ground level and will be carried by the belts 10 inwardly to the open space at 13, and will be deposited on the ground. Next, this loosely spread crop will pass through the opening 28 and will be impelled by means of the arcuate portions 26 in the direction of the arrow 51 through the casing 27, and the rapidly rotating elements 26 will cause a thorough mixing or homogenizing of the crop, and the leaves and stems.

This resultant material will then pass in the direction of the arrow 52 between the members 31 and into the space 53 (see FIGURE 2) between the members 36, and and at this point will fall by gravity to the ground.

The tendency of the thoroughly mixed leaves, grass, etc., will be to cause the crop material to adhere, or to be held more firmly together, and as a result the windrow thus formed will appear substantially as shown in FIGURE 3 by the dotted lines character 54, or in other words as the unit travels forwardly a substantially heightened rectangular windrow will be formed, which will thereby present a much greater surface area, thereby insuring a much more rapid drying of the crop.

The characters 55 and 56 indicate in FIGURES 4 and 5 the other shapes of windrows which will be provided by merely adjusting the turn-buckle arrangement above described, so that the windrows formed can be of desired shapes.

FIGURE 6 illustrates a further modification wherein the canvas members 36 can be replaced by relatively thin sheet metal members 57 and whereby longer hinged elements at 58 can be provided, the balance of the structure of this modification including the same turn-buckle arrangement above described, the members 57 being flexible enough so that they will propery bend or flex to the desired shape.

It should be specifically understood herein that the above described invention pertains to the essential basic features of the invention, and that other modifications could be used as well, and it will be noted that I have provided the advantages mentioned in the objects of my invention.

Some changes may be made in the construction and arrangement of the parts of my invention without departing from the real spirit and purpose of my invention, and it is my intention to cover by my claim any modified forms of structure or use of mechanical equivalents which may be reasonably included within their scope.

I claim as my invention:

An apparatus for forming a hay windrow comprising a forwardly positioned cutting member, a casing communicating with said cutting member, a windrow-forming member attached rearwardly of said casing and being adapted to concentrate material passing from said casing into a pre-determined windrow shape, said windrow forming member including a pair of laterally spaced walls between which said material is concentrated, means for adjustably positioning laterally the upper portions of said laterally spaced walls, further walls attached to said laterally spaced walls and attached to said casing for concentrating the material passing from said casing between said laterally spaced walls.

References Cited by the Examiner

UNITED STATES PATENTS

| | | | |
|---|---|---|---|
| 2,620,611 | 12/52 | Russell | 56—1 |
| 2,790,290 | 4/57 | Tufford | 56—1 |
| 2,850,861 | 9/58 | Miller | 56—23 |
| 2,949,718 | 8/60 | Buchanan | 56—192 |
| 2,975,578 | 3/61 | Drauden et al. | 56—23 |
| 2,999,348 | 9/61 | Cunningham | 56—23 |
| 3,059,403 | 10/62 | Bamford et al. | 56—366 |

ANTONIO F. GUIDA, *Primary Examiner.*